(12) United States Patent
Konsella et al.

(10) Patent No.: US 6,856,317 B2
(45) Date of Patent: Feb. 15, 2005

(54) SYSTEM AND METHOD FOR STORING PUBLIC AND SECURE FONT DATA IN A FONT FILE

(75) Inventors: Shane R. Konsella, Star, ID (US); Terrence M. Shannon, Kuna, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 110 days.

(21) Appl. No.: 10/417,876

(22) Filed: Apr. 16, 2003

(65) Prior Publication Data

US 2004/0207627 A1 Oct. 21, 2004

(51) Int. Cl.[7] ............................................. G06T 11/00
(52) U.S. Cl. ............................................. 345/471; 707/9
(58) Field of Search ................................. 345/471, 472, 345/472.1, 472.2, 472.3; 707/9, 10

(56) References Cited

U.S. PATENT DOCUMENTS

| 6,012,071 A | 1/2000 | Krishna et al. |
| 6,065,008 A | 5/2000 | Simon et al. |
| 2003/0145206 A1 * | 7/2003 | Wolosewicz et al. |

* cited by examiner

Primary Examiner—Matthew Luu

(57) ABSTRACT

A system and method is provided for storing public and secure font data in a font file. The system and method include public glyph data stored in the font file. Secure glyph data is also provided that corresponds to the public glyph data and the secure glyph data is stored in the font file in an encrypted form. A security logic module is included and configured to allow the secure glyph data to be used when a decryption key is provided by a user to decrypt the secure glyph data.

25 Claims, 3 Drawing Sheets

SYSTEM AND METHOD FOR STORING PUBLIC AND SECURE FONT DATA IN A FONT FILE

FIELD OF THE INVENTION

The present invention relates generally to electronic fonts.

BACKGROUND

Fonts are used by computers for on-screen display, hard-copy printing, and for other output devices. A "font" is a set of characters of the same typeface, style, stroke weight, and size. For example, a font typeface may be Times New Roman, Arial, or Courier. The font style can be italics or underline, the stroke weight can be bold, and the size can be 12 point. More generally, a font defines how a set of characters appears when displayed, printed or output by a computer.

Early computer operating systems relied on bitmapped fonts for display and printing. These fonts had to be individually created for displaying the font at each desired size, style or stroke weight. If the font was scaled to sizes larger or smaller than the font's originally intended size, then the output was significantly degraded. In addition, printed text was almost always jagged looking.

A font is generally defined by a set of mathematical rules or glyph information contained in a font file. The rules define how a computer converts font data into pixel data for turning on and off the appropriate dots or pixels to form the glyphs. A "glyph" is an image, form, or shape used for the visual representation of characters. For instance, in a cursive or handwritten style font, the character represented by a lowercase "r" is rendered as one of two possible glyphs, depending on what character precedes it in the text.

One example of a widely used font is TrueType font. TrueType technology and other similar font systems involve two parts. The first part of the system is the font rasterizer and the second part is the font file. The rasterizer is a piece of software that is used by the operating system to gather mathematical information from the font file about the outline description of a character, and the rasterizer scales and adjusts that mathematical information. The font file or font data is converted by the rasterizer into a bitmap that can be understood by a graphics card, monitor or printer. The rasterizer can be considered an interpreter that understands the mathematical data supplied by the font file and translates the data into a form that the video display or printer can output.

The font file describes the outline of each character in the typeface. In the case of TrueType fonts or other higher quality fonts, mathematical points, splines, or vectors are used to describe the font and hinting codes may also be included. Hinting is a process that helps a scaled font look its best. Instead of simply relying on the character outline, the hinting codes ensure that the characters line up well with the pixels so that the font looks as smooth and legible as possible.

In addition to the process of simply creating a font, many situations exist where font file data needs to be protected from unauthorized use. For instance, a large business may have a CEO's signature that is encoded in a font for the purposes of electronically signing checks since the CEO could never manually sign all of the checks used in day-to-day business. Because of the value of a "signature font" or secure font, it is important that the secure font not be accessed or used by unauthorized individuals.

If only a secure font is used in a document, then an individual who is not authorized may not be able to view what is written in the document. The reason that an unauthorized individual does not have access to the font is because the font is not installed on their computer or printer. This also means that only authorized individuals can draft a document containing the secure font. This use of a secure font is not a particularly efficient or convenient system.

In order to avoid the problem just discussed, current font developers use two separate font files with the same glyph metrics. One font is a public font and the second font is a secure font. This allows everyone in a company to install the public font onto their operating system and printers. When a secure document is viewed or printed by personnel who are not authorized to use the secure font, the public font is used and the document may be read or printed. In this case, it will be obvious to anyone reading or printing the document with the public font that this is not an "official" copy printed with the secure font.

On the other hand, authorized personnel are allowed to install the secure font for the purpose of making and printing "official" copies. Often a printer or computer with a secure hardware font is installed on a device kept in a locked room.

There are a number of disadvantages with the current system of administrating secure fonts. The first disadvantage is that there are multiple font files for each secure font. Administrators and developers of the secure font must update and distribute two fonts. In addition, the glyph metrics in each of these two fonts must be identical. This creates a significant amount of redundant data that will be installed for those who use the secure font. A mechanism for substituting one font for the other where users have both fonts installed is also installed onto a user's computer.

The administration of two font files can create document reflow issues with secure fonts. If a user who is not authorized to use the secure font views the document that was drafted with the secure font, a substitution font may be used. The substitution font is normally the public font but some users may not have the public font installed or the metrics in their public font may not be current. Accordingly, the substitution font may cause unreadable text reflow or other document problems.

Another drawback in current secure font systems is that security is provided by physically limiting possession of the secure font. Once someone has or gains possession of the secure font, that individual is able to use the font even if they are an unauthorized user. For this reason, software versions of secure fonts are almost never produced. Secure fonts are typically stored on DIMMs, Flash RAM, and similar expensive hardware storage devices. This allows a hardware font to be installed only on a printer that is kept in a locked room. Then that printer can be used to produce "official" copies of documents using the secure font.

SUMMARY OF THE INVENTION

The invention provides a system and method configured for storing public and secure font data in a font file. The system and method include public glyph data stored in the font file. Secure glyph data is provided that corresponds to the public glyph data and the secure glyph data is stored in the font file in an encrypted form. A security logic module is also included and configured to allow the secure glyph data to be used when a decryption key is provided by a user to decrypt the secure glyph data.

DETAILED DESCRIPTION

Figure 1:
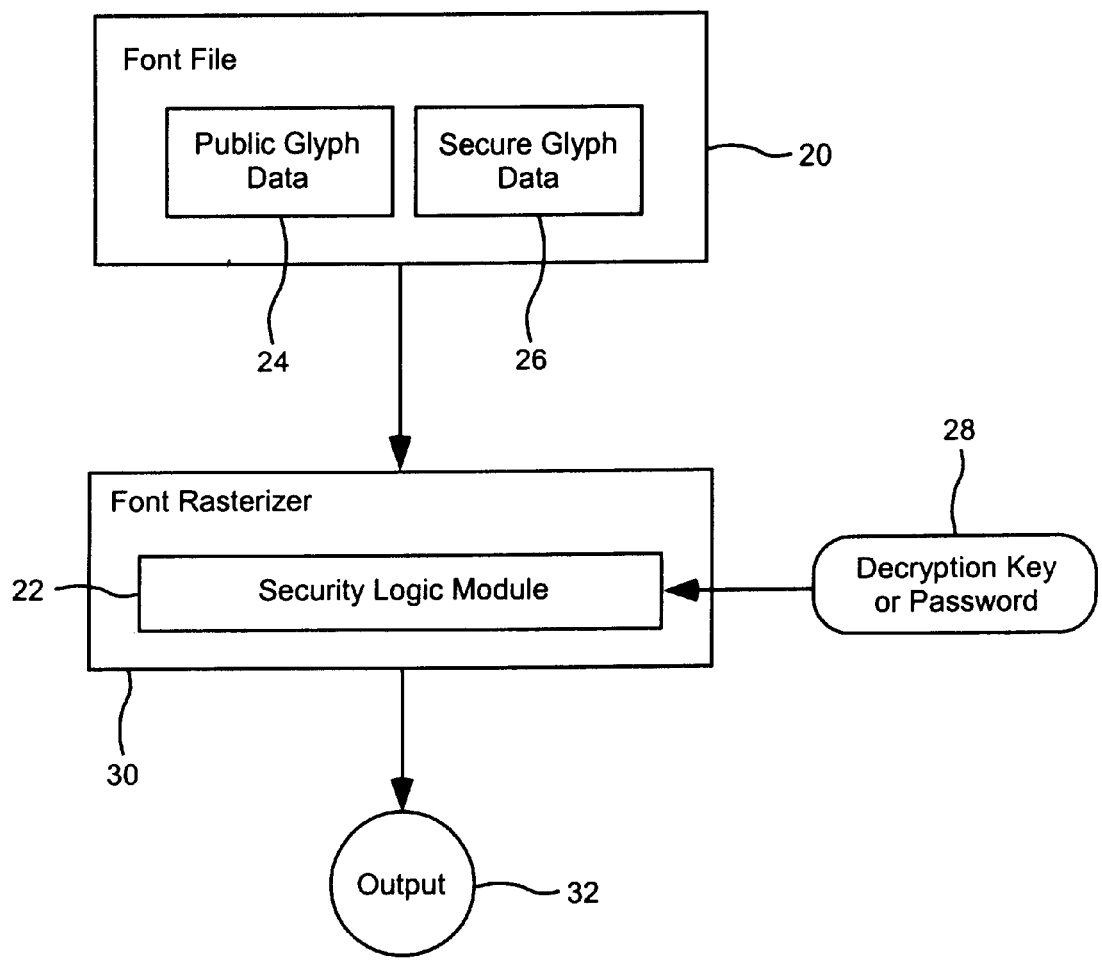
FIG. 1 is a block diagram of a system for storing secure glyph data and public glyph data in a font file in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The present invention includes a system and method for storing public and secure font data in a font file. The secure font data is provided to users who need to print or view secure files and official documents. For example, the secure font data can be used for printing signed checks, official correspondence, and similar documents.

The system includes public glyph data 24 stored in the font file 20 as illustrated in FIG. 1. Secure glyph data 26 is included that corresponds to the public glyph data. In addition, the secure glyph data is stored in the font file in an encrypted form. The secured glyph data corresponds to the public glyph data using the approach that a secure glyph is generally mapped to each public glyph. This means that for most every glyph, image, character or other form that is stored in the font file there can be a public form without any encryption and a secure form that is encrypted. For example, a font file using the present invention can include a secure letter "*ƒ*" for a person's signature that is encrypted and then a public letter "S" that can be used to correspond to the secure script letter S.

Figure 2:
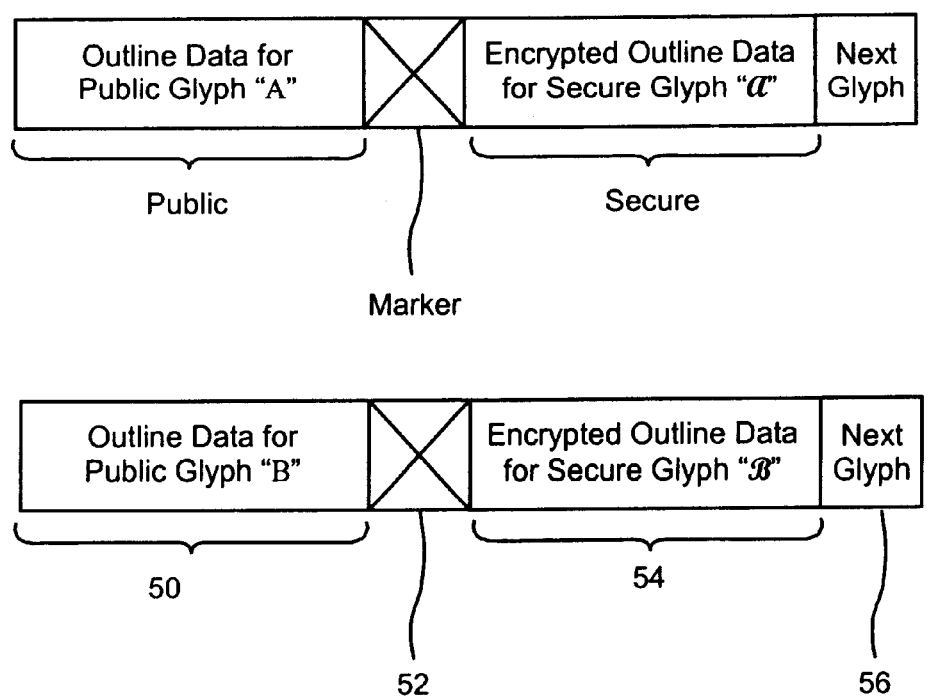
FIG. 2 is a block diagram illustrating one embodiment of file structure for a font file with secure glyph data and public glyph data as in FIG. 1.

FIG. 2 illustrates a more detailed embodiment for storing the glyph data in a font file. Outline data for the public glyph 50 is stored first. A marker 52 is included to separate the public glyph data from the secure glyph data 54 and to denote the location of the secure glyph data. The encrypted outline data for the secure glyph data is stored after the marker. The marker can also denote the beginning of the secure glyph data. The marker data can be a specific non-font character or some other electronic code that has been pre-determined. The outline data illustrated in FIG. 2 can also include the appropriate ligands or alternative font outlines for each character in the font data. A next glyph marker 56 can be included after each set of public and secure glyph data for a character.

In an alternative embodiment of the invention, the secure glyph data can be located in some other location as opposed to directly following the public glyph data. For example, the secure glyph data may be located before the public glyph data and the public and secure glyph data can be separated by a marker. In addition, all the secure glyph data can be located in one portion of the glyph data structure and all the public glyphs can be located together in a second part of the glyph data structure. Then the rasterizer can access the secure and public glyphs using an offset to both the secure and the public glyph data. In any event, the glyphs can be organized in the file in any structure that allows the rasterizer to find and recognize both the secure and public glyphs in the font file.

The arrangement of the public and secure glyph data in the embodiment of FIG. 2 can be implemented in one embodiment using a TrueType font format. In a TrueType font, the glyphs are packed into a data structure which is called the "glyf" table. Another table called the "loca" table lists the offset(s) within the glyf table where each glyph is located. The size of a given glyph is normally calculated by subtracting the offset of the given glyph from the offset of the next glyph. If the length is 0, it is called an empty glyph.

The above calculated length can actually be greater than the real number of bytes of data needed to define the glyph. For a non-empty glyph, the rasterizer simply starts at the beginning of the glyph (an offset within the glyph table) and processes the glyph data to create a "rasterized" or bit map image of the glyph. Any extra data in the glyph has been ignored in the past.

The glyph's header indicates the number of points defined in the glyph and similar glyph information. By examining the glyph's header, the rasterizer can calculate the real number of bytes defined in the glyph and the secure glyph data can be stored between a given glyph and the next glyph. The secure data for the present invention can be stored in the extended space which is currently ignored by the rasterizer. Since the secure glyph data is stored in a space that would normally be ignored by the rasterizer, the marker can be used and an enhanced rasterizer can tell that these extra bytes are to be used as the secure glyph data. Thus, the data will not be ignored by the rasterizer because the marker identifies the beginning of the secure glyph.

Returning to FIG. 1, a font rasterizer 30 is included in the present system to recognize the secure glyph data. The rasterizer generates character bitmaps for output devices 32 such as display screens and printers. These output devices are often called raster devices. A rasterizer accomplishes this task by reading the outline description of the character from the font file. The outline description includes points, lines, splines, and hinting codes. The rasterizer scales the character to the requested size and output resolution. The outline of the font is also adjusted to the pixel grid based on hinting information, and then the adjusted outline is filled with pixels and sent to the output device. This last step is called scan conversion.

The font rasterizer of the present invention is different than previous font rasterizers because it includes a security logic module 22 to manage the font file. The security logic module is configured to decrypt the secure glyph data. A decryption key 28 or password can be provided to the font rasterizer by a user. This enables the font rasterizer to render either the public glyphs or the secure glyphs based on whether the correct decryption key was entered. Users who do not have the appropriate decryption key will only be able to view the public glyphs. This avoids the problem of a secure or official document that is distributed to multiple users who cannot view the document because they do not have authorization to obtain the secure font.

By using a decryption key to control the viewing of the secure font, a secure official document can be distributed to and read by anyone who has the combined public and secure font data. An example of this is an accounting office where some accountants, who are not authorized to use the secure font, are able to access a check and view the information on that check using the public font. On the other hand, the unauthorized accountants are not able to print or view the official copy of that check. This allows the unauthorized accountants to work with documents without the risk that they will print unwanted "official" copies. In addition, an authorized accountant in the office can use their password to view the official copy and then print a valid signed check.

In one embodiment of the invention, the enhanced font rasterizer 30 can be located in a printer. A user can then enter a decryption key or password 28 into the printer to enable the secure font to be printed at the specific printer. The decryption key can be entered into the printer through a keypad interface or the front panel on the printer and this is a relatively secure method for enabling the secure font. The encryption key can also be entered via a prompt from the printer driver as a part of the print job or through a web interface. Supplying the decryption key using the printer driver or using a network connection is relatively less secure because the printer job stream might be intercepted.

One valuable element of the present invention is that the secure font data includes an electronic form of security as opposed to a physical form of security. Since the secure glyph data is encrypted and password protected, the font file may be broadly distributed without significant concern for who may actually obtain the file. Only users with the restricted password will have access to the secure font data. Official copies of information using the secure font may be made anywhere the font is distributed, not just with a printer or computer that is located in a locked room. The electronic security also reduces the risk that someone will hack into a system and steal the electronic font and be able to use it. Someone who obtains the font will either have to be able to break the encryption to use the secure font or simply know the password.

Combining the public font data and the secure font data in a single file also lowers the cost of producing and distributing the secure font. This is because the font may be distributed in software form and used on any computer system or printer. For example, a software font can be emailed to recipients who need the secure font and then installed on their local computer or printer as needed. This overcomes the requirement of buying a high cost hardware version of the font that is copied onto a DIMM or Flash RAM.

The public and secure glyph data can be configured to use a shared copy of the glyph metric data. This avoids font reflow problems, reformatting problems, and printing problems. Although this is not a required element of the font file described herein, the use of a shared copy of the glyph metric data is valuable to avoid reflow and reformatting problems. If the public glyph data and the secure glyph data each have their own metric data, then the official copy and the public copy of a document may have inconsistent or truncated text output. It is more useful to use the same glyph metric data to allow the public glyph metrics to conform to the secure glyph metrics.

Another advantage of the present invention is that there is a single font file for the secure and public font information. There is no need for separate public and secure font files. Being able to use a single font file is valuable because it reduces the amount of redundant data that is necessary. The removal of redundant information is especially apparent with the metric data that is used in the font file which will not generally differ between the public font file and the secure font file. In addition, font developers do not have to spend extra time updating duplicate metric data or any other redundant data that may be used in two font definitions.

Figure 3:
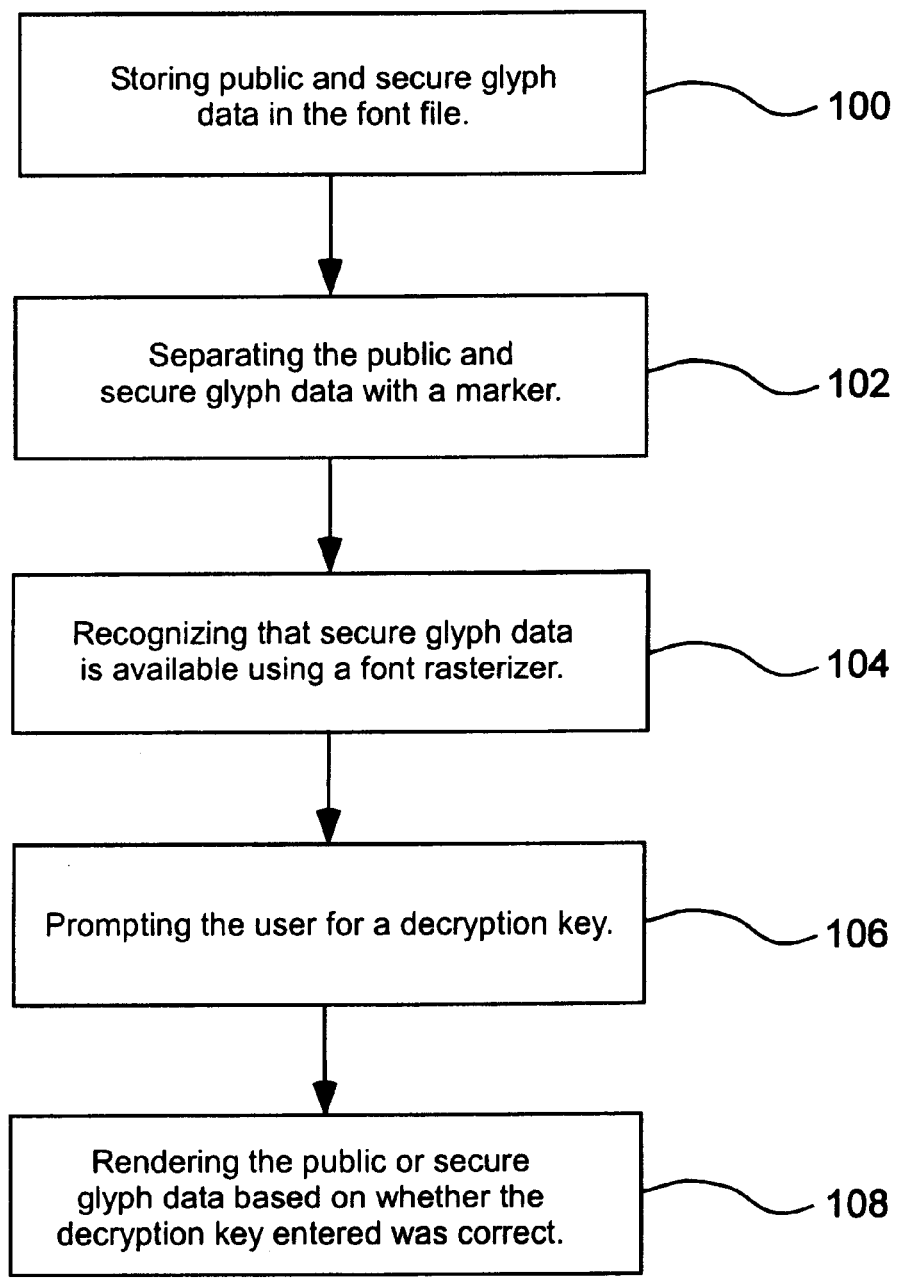
FIG. 3 is a flow chart illustrating a method for using secure glyph data and public glyph data in a font file in an embodiment of the invention.

The present invention further includes a method for combining public and secure font data in a font file, as illustrated in FIG. 3. The method includes the operation of storing public glyph data and secure glyph data in the font file in block 100. Another operation is separating the public and secure glyph data with a marker in block 102. As discussed previously, the marker will separate the public and secure data and the marker can be any digital marker or electronic code that is recognized by the rasterizer to be a marker. For example, the marker can be a non-printing character, a flag, or similar information that is a marker.

Another operation in the method is recognizing that the secure glyph data is available using the font rasterizer in block 104. As the font rasterizer accesses the font file, the rasterizer recognizes the public glyph data because this public data is provided first at a given character offset. In addition, the font rasterizer of the present invention can recognize the marker and then the secure glyph data that is associated with the marker in the font file. Since the font rasterizer has recognized that a secure glyph exists or a secure set of glyphs exists, the user can be prompted for a decryption key in block 106. A further operation is the rendering of the public or secure glyph data based on whether the correct decryption key was entered by the user as in block 108. As discussed previously, the secure glyph data will be encrypted in the font file and the decryption key will enable the secure glyph data to be decrypted. In addition, a password can be used to enable the decryption or the password can be the decryption key.

The public and secure glyphs discussed for the present invention are not limited to language characters. The secure glyphs can be a corporate seal, special bar codes with a corresponding readable character, machine readable codes, or a secure banking font. For example, a governmental entity may have an official seal that indicates when an original document is being presented. Thus, the secure glyph can be the official seal and the public glyph can be a simplified symbol that is the same size. In addition, the secure characters do not necessarily need to be a single character. A secure character could be an entire signature that is difficult to map to separate characters and the public character could be the signing individual's printed initials.

In another embodiment, the secure characters could be postage stamps with an official copy that is encrypted and a public non-usable copy. When the secure postage stamp characters are used, the rasterizer can include a metering component that charges the user for the use of the secure postage stamp.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A system configured for storing public and secure font data in a font file, comprising:
   public glyph data stored in the font file;
   secure glyph data that corresponds to the public glyph data and the secure glyph data is stored in the font file in an encrypted form; and
   a security logic module configured to allow the secure glyph data to be used when a decryption key is provided by a user to decrypt the secure glyph data; and
   a marker to separate the public data from the secure glyph data and to denote the location of the secure glyph data.

2. A system as in claim 1, further comprising a font rasterizer configured to recognize the secure glyph data.

3. A system as in claim 2, wherein the font rasterizer is able to decrypt the secure glyph data through the security logic module using the decryption key provided by the user.

4. A system as in claim 2, wherein the font rasterizer uses the decryption key provided by the user and renders either the public glyphs or the secure glyphs based on whether the correct decryption key was entered.

5. A system as in claim 1, wherein the public glyph data and the secure glyph data use a shared copy of glyph metric data.

6. A system as in claim 1, wherein the public glyph data and secure glyph data are stored in a TrueType format font file.

7. A system as in claim 1, wherein the marker denotes the beginning of the secure glyph data.

8. A system as in claim 1, wherein the decryption key is a password.

9. A method for combining public and secure font data in a font file, comprising the steps of:
   storing public glyph data and secure glyph data in the font file;
   separating the public glyph data and secure glyph data with a marker;
   recognizing that the secure glyph data is available using a font rasterizer;
   prompting the user for a decryption key; and
   rendering the public or secure glyphs based on whether a correct decryption key was entered.

10. A method as in claim 9, wherein the step of storing the public glyph data and secure glyph data further comprises the step of encrypting the secure glyph data in the font file.

11. A method as in claim 9, further comprising the step of decrypting the secure glyph data when the correct decryption key has been entered.

12. A method as in claim 9, further comprising the step of using a shared copy of glyph metric data for the public glyph data and the secure glyph data.

13. A method as in claim 9, further comprising the step of storing the public and secure glyph data in a TrueType format font file.

14. A method as in claim 9, further comprising the step of situating the secure glyph data after the public glyph data.

15. A method as in claim 9, further comprising the step of entering a password to enable the decryption.

16. A system configured for storing public and secure font data in a font file, comprising:
   a font file, further comprising:
      public glyph data stored in the font file;
      secure glyph data that corresponds to the public glyph data and the secure glyph data is stored in the font file in an encrypted form; and
      a marker to separate the public glyph data from the secure glyph data and to denote the location of the secure glyph data; and
   a font rasterizer configured to recognize the secure glyph data based on the location of the marker, the font rasterizer further comprising a security logic module configured for decrypting the secure glyph data.

17. A system as in claim 16, further comprising a decryption key that can be entered by a user to enable the font rasterizer to decrypt the secure glyph data.

18. A system as in claim 16, further comprising an output device to which the font rasterizer supplies font bitmaps.

19. A system as in claim 16, wherein the public glyph data and the secure glyph data use a shared copy of glyph metric data.

20. A system configured for storing public and secure font data in a font file, comprising:
   public glyph means for representing public glyph data stored in the font file;
   secure glyph means for representing secure glyph data that corresponds to the public glyph data and the secure glyph data is stored in the font file in an encrypted form;
   a marking means for separating the public glyph data from the secure glyph data and for identifying the beginning of the secure glyph data; and
   a security means for decrypting the secure glyph data when a decryption key is provided by a user.

21. A system as in claim 20, further comprising a rasterizer means for recognizing and rendering the secure glyph data.

22. An article of manufacture, comprising:
   a computer usable medium having computer readable program code means embodied therein for combining public and secure font data in a font file, the computer readable program code means in the article of manufacture comprising:
   computer readable program code means for storing public glyph data and secure glyph data in the font file;
   computer readable program code means for separating the public glyph data and secure glyph data with a marker;
   computer readable program code means for recognizing that the secure glyph data is available using a font rasterizer;
   computer readable program code means for prompting the user for a decryption key; and
   computer readable program code means for rendering the public or secure glyphs based on whether a correct decryption key was entered.

23. An article of manufacture as in claim 22, further comprising readable program code means for encrypting the secure glyph data in the font file.

24. A method for combining public and secure font data in a font file, comprising the steps of:
   storing public glyph data and secure glyph data in the font file;
   separating the public glyph data and secure glyph data using a data structure;
   recognizing that the secure glyph data is available using a font rasterizer;
   prompting the user for a decryption key; and
   rendering the public or secure glyphs based on whether a correct decryption key was entered.

25. A method as in claim 24, wherein the step of storing the public glyph data and secure glyph data further comprises the step of encrypting the secure glyph data in the font file.

* * * * *